(12) United States Patent
Mills et al.

(10) Patent No.: US 12,177,259 B1
(45) Date of Patent: Dec. 24, 2024

(54) MODELING A NETWORK DATA CENTER ARCHITECTURE, AND APPLICATIONS THEREOF

(71) Applicant: DIGITAL PORPOISE, LLC, Austin, TX (US)

(72) Inventors: Scott William Mills, Highlands Ranch, CO (US); Brooke James Mouland, Denver, CO (US); Scott Michael Wallace, Fishers, IN (US); Okechukwu Ekene Keke, Elkins Park, PA (US); Brian Andrew Cade, Dallas, TX (US); Travis Duane Ewert, Highlands Ranch, CO (US)

(73) Assignee: DIGITAL PORPOISE, LLC, Austin, TX (US)

( * ) Notice: Subject to any disclaimer, the term of this patent is extended or adjusted under 35 U.S.C. 154(b) by 0 days.

(21) Appl. No.: 18/504,374

(22) Filed: Nov. 8, 2023

(51) Int. Cl.
*H04L 9/40* (2022.01)
(52) U.S. Cl.
CPC .................................. *H04L 63/20* (2013.01)
(58) Field of Classification Search
CPC ....................................................... H04L 63/20
USPC .............................................................. 726/1
See application file for complete search history.

(56) References Cited

U.S. PATENT DOCUMENTS 11,857,872 B2 * 1/2024 Vukojevic ............. A63F 13/358

* cited by examiner

*Primary Examiner* — Anthony D Brown
(74) *Attorney, Agent, or Firm* — Sterne, Kessler, Goldstein, Fox P.L.L.C.

(57) ABSTRACT

In an embodiment, a method automatically determines a networked data center architecture. In the method, a database describing capabilities of a data center provider is assembled. The database describes capabilities of a plurality of data centers of the data center provider. A specification of requirements for the networked data center architecture is received. The specification describes data processing and connectivity requirements of a customer of a data center provider. The database is searched to determine a solution including a plurality of connections and data center that satisfy the specification. Based on the searching, the solution is output as a recommendation to provide the networked data center architecture. In another embodiment, options for a networked data center architecture are visualized. In yet another embodiment, API calls are made to provision the networked data center architecture.

19 Claims, 17 Drawing Sheets

CLOUD ERP

Hosting Location
Cloud

Data Center
└ Cypress Creek Hosting-NYC

+ Add Hosting Location

Latency Tolerance

| 0-15 MS | 16-30 MS |

| 31-45 MS |

General Notes
Add Notes

Confirm Application Settings

Choosing hosting location ✕

⌃ Cloud ⊕

XYZ ⊕

Company A ⊕

Company B ⊕

Cloud ⊕

If you do not see a cloud in this list, add a cloud

⌃ Data Center ⊕

Cypress Creek Hosting-NYC ⊖

Cypress Creek Hosting- PNW ⊕

If you do not see a datacenter in this list, add a datacenter

FIG. 4

Discover

Project Summary  Project Details

North America :: Asia Pacific :: South America :: Europe :: Africa :: + Add Region Current State                                    Future State Compliance  Data Centers  Clouds  Applications  Partnership/Suppliers  Customer Locations

[icon] Chevy Chase MA   [icon] Paris TX   [icon] Walla Walla WA   [+] Add Location

- Discover
- Model
- Briefcase
- Sol. Brief
- Library

MODELING A NETWORK DATA CENTER ARCHITECTURE, AND APPLICATIONS THEREOF

FIELD

The field relates to data center management.

BACKGROUND

Data centers are facilities that house and operate various types of computing, networking, and storage equipment, as well as the power, cooling, security, and connectivity systems that support them. Data centers enable the processing, storage, and transmission of large amounts of data for various purposes, such as cloud computing, web hosting, online services, e-commerce, artificial intelligence, and big data analytics. Data centers can vary in size, design, and location, depending on the needs and preferences of the owners and users. Some data centers are owned and operated by large corporations while others are leased by smaller businesses or organizations. Data centers may be classified by tiers, which indicate their level of redundancy, reliability, and availability.

There are different ways that data centers lease space for IT infrastructure, but one common model is called colocation, or colo for short. Colocation is a service that allows customers to rent space, power, cooling, security, and network connectivity for their own IT infrastructure, such as servers, in a shared facility. The customers typically own and manage their own IT infrastructure, but benefit from the economies of scale, redundancy, and expertise of the data center provider.

Colocation can be offered at different levels of granularity, depending on the customer's needs and budget. Some common units of space that data centers lease for servers are rack unit (U), cabinet or cage, or suite. The cost and availability of these options can depend on various factors, such as the location, capacity, demand, and features of the data center, as well as the contract terms, service level agreements, and additional services that the customer may need or want.

Data centers can provide connectivity to collocated equipment in a variety of different ways, depending on the type and level of service that the customer requires. Data centers can provide Open Systems Interconnection (OSI) layer 1 cross-connects (e.g., physical cables that connect the customer's equipment to the data center's network infrastructure, such as routers, switches, firewalls, or other service providers). Additionally or alternatively, data centers can provide Ethernet, private network or internet access. In a further example, data centers can provide a customer direct connectivity (without having to bridge the Internet) to a cloud provider, such as AWS available from Amazon, Inc., Azure available from Microsoft, Inc., or Google Cloud, available from Alphabet Inc. These connections can be dedicated or on-demand through network automation.

With such a wide variety of service options available, identifying the best option to build out an environment in a data center can be a time-consuming process. Moreover, the ultimate selection may be suboptimal. Improved methods and systems are needed to identify, model, build out, and activate data center environments.

SUMMARY

In an embodiment, a method automatically determines a networked data center architecture. In the method, a database describing capabilities of a data center provider is assembled. The database describes capabilities of a plurality of data centers of the data center provider. A specification of requirements for the networked data center architecture is received. The specification describes data processing and connectivity requirements of a customer of a data center provider. The database is searched to determine a solution including a plurality of connections and data centers that satisfy the specification. Based on the searching, the solution is output as a recommendation to provide the networked data center architecture. In another embodiment, options for a networked data center architecture are visualized. In yet another embodiment, API calls are made to provision the networked data center architecture. Additionally or alternatively, multimodal AI can look at all the data up front through design build, or after, to provision or take action.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF DIAGRAMS

The features and advantages of the example embodiments described herein will become apparent to those skilled in the art to which this disclosure relates upon reading the following description, with reference to the accompanying drawings.

FIGS. 3-7 are user interfaces for collecting requirements for a networked data center architecture.

FIGS. 8-9 are user interfaces for presenting options such as space and equipment for a networked data center architecture generated according to the collected requirements.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Figure 1:
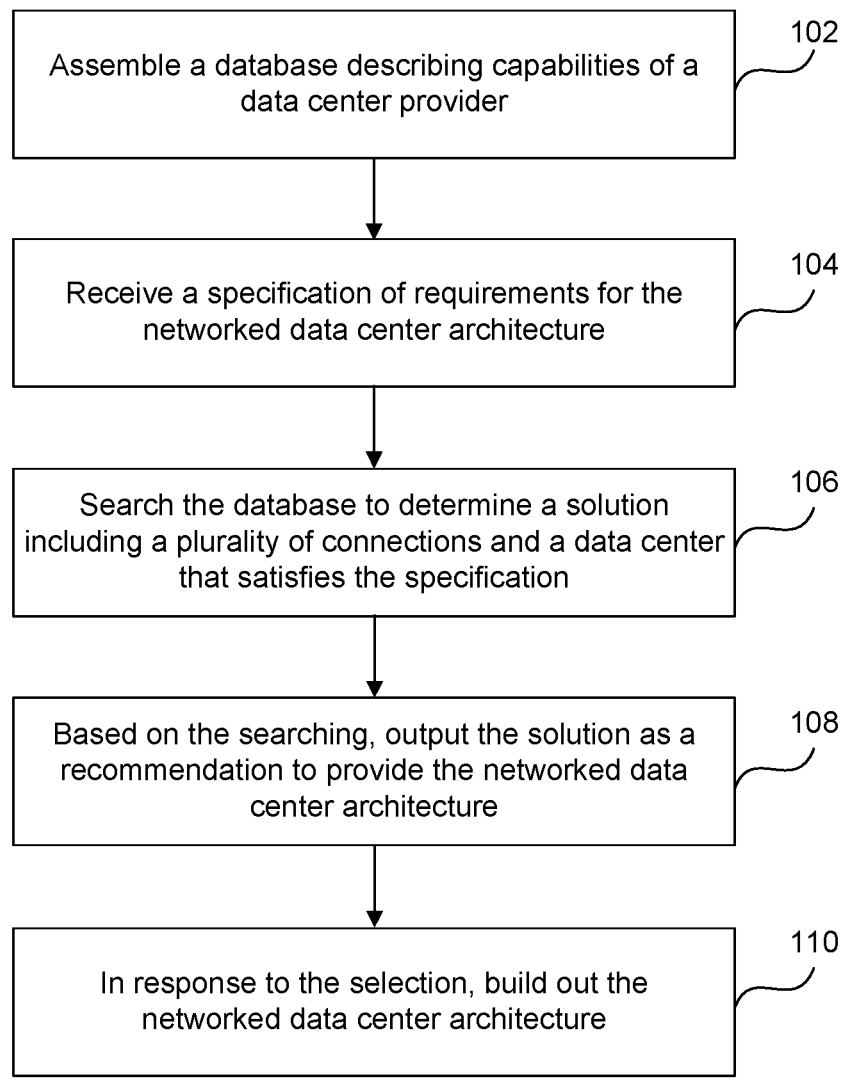
FIG. 1 is a flowchart illustrating a method for modeling and provisioning a networked data center architecture, according to an embodiment.

FIG. 1 is a flowchart illustrating a method 100 for modeling and provisioning a networked data center architecture, according to an embodiment.

At step 102, a database describing data center capabilities is assembled. The database describes capabilities of a plurality of data centers of the data center providers. The capabilities can include space availability and connectivity information. The database can also include publicly available and real-time information. Greater detail on the data assembled is provided below with respect to FIG. 2 and data sources 202 and 204. To gather the data, requests may be periodically or intermittently made to publicly available data sources such as those provided by the United States Geological Service (USGS). In addition, data may be periodically or intermittently gathered from databases local to a data center service provider. The data may be gathered from both relational and non-relational sources, such as graph databases. As the data is pulled from heterogeneous sources, the assembled data may be rationalized and normalized in the database.

At step 104, a specification describing requirements for networked data center architecture is received. The specification describes data processing and connectivity requirements of a customer of a data center provider. The requirements include locations for data centers sought in the networked data center architecture, cloud connections sought in the networked data center architecture, applications to be supported by the networked data center architecture, where servers providing the applications are hosted or located (e.g., data center, cloud, customer premises), and vendors utilized to build or support the networked data center architecture (e.g., network service providers, software vendors, hardware vendors, value added reseller of equipment). There also may be geographic and environmental requirements. For example, the specification may include information about the climate, state regulatory and tax requirements, and proximity to infrastructure such as gas lines, electrical transmission lines, and city centers. More detail on how the requirements are gathered is described with respect to FIGS. 3-7.

At step 106, the database assembled at step 102 is searched for solutions matching the requirements at step 104. In an example, the requirements may be translated into queries and the queries may be used to search the database. In other examples, the requirements may be used to develop a cost function for different solutions and the cost function may be used to employ a search and optimization algorithm. For example, nonlinear programming may be used to find the optimal solution based on the requirements from the database. Example nonlinear programming algorithms include gradient-based methods, such as gradient descent, Newton's method, and conjugate gradient; and derivative-free methods, such as Nelder-Mead, genetic algorithms, and simulated annealing.

The solutions may involve a combination of existing data center space, equipment, and connectivity options. For example, a solution may involve consolidating processing to alter a customer's data center architecture from two centers instead of eight. A solution may also involve identifying where resources are best deployed. For example, the solution may involve moving a customer's firewall to a different location.

At step 108, the recommended solutions are sorted based on preferences. Different types of scoring can be used to generate the recommendations. As mentioned above, a scoring may be determined based on a cost function set based on the requirements entered at step 104. In other examples, different preferences may be used to sort the solutions identified at step 104 and select recommendations from the solutions. The preferences can include cost, such as immediate cost and total cost of ownership. In addition, the preferences can involve performance metrics, such as estimated power usage, or estimated processing or communication latency. In a further example, the preferences can include availability.

Figure 8:
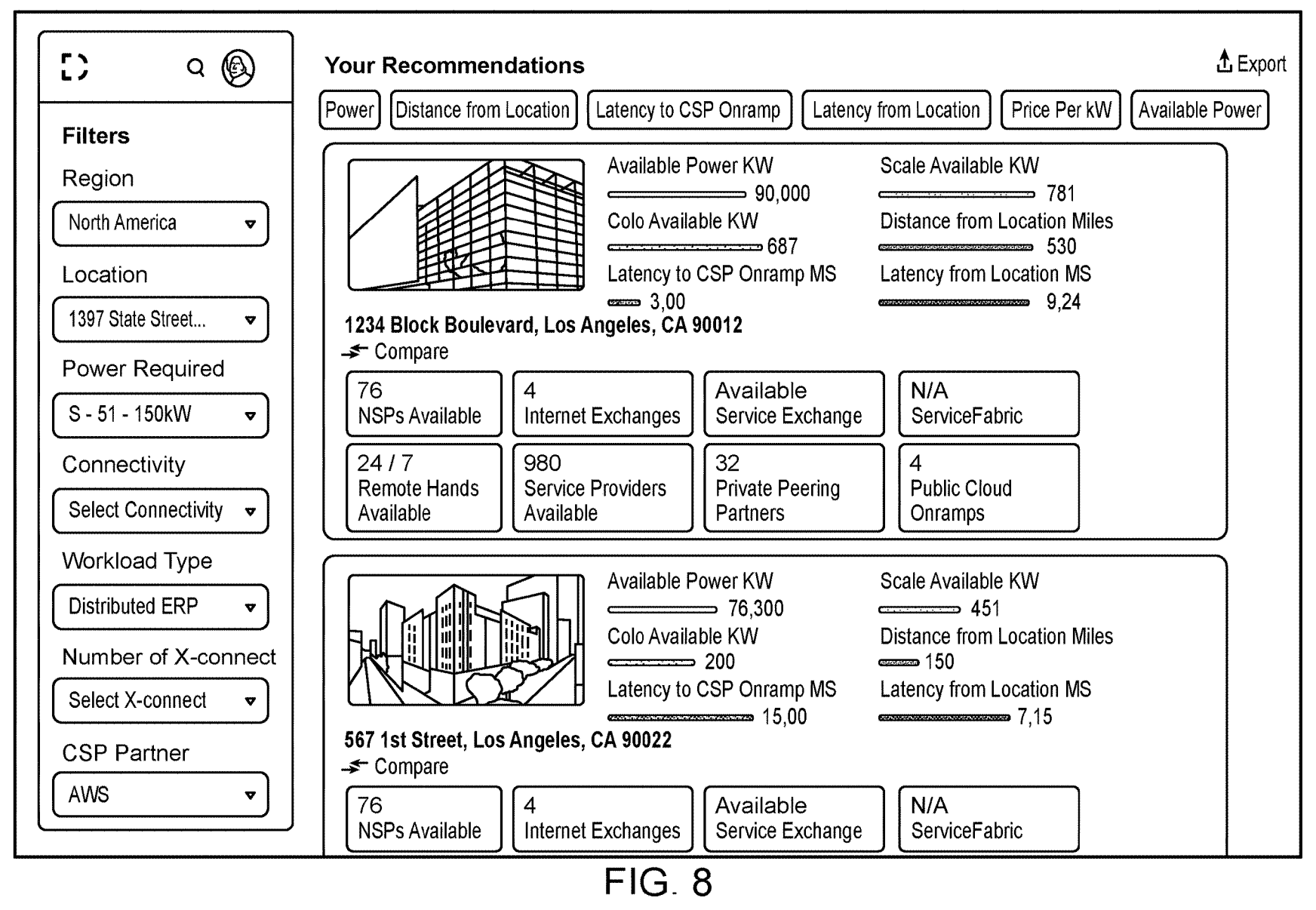
Figure 9:
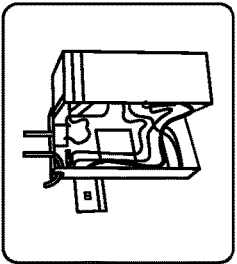

The preferences may be a combination of these various metrics. For example, a slider may be presented between performance and cost, and a user can move the slider to select relevant importance of the two different factors. Based on the relative importance of the two different factors, different weights are assigned different scores and are calculated for the various solutions identified at step 106. And the various solutions identified at 106 are sorted to provide different recommendations based on the user preferences. An example of recommendations for data center equipment is illustrated in FIGS. 8 and 9.

At step 110, API calls are made to build out a desired solution. The user selects a recommended solution. Then, the API calls may involve allocating space at the data center for customer equipment. Additionally or alternatively, the calls may involve ordering the desired equipment and/or ordering their assembly on site. Additionally or alternatively, calls may involve provisioning connectivity resources between data center equipment. For example, it may involve activating virtual ports or physical ports on switch routers to create the connections called for in the selected solution. It may involve calls to partner interfaces using, for example a network-to-network interface. A network-to-network interface (NNI) is an interface that specifies signaling and management functions between two networks.

In this way, the customer lifecycle is streamlined. The process by which a data center customer shops for, buys, and gets its networked data center architecture is further automated and realized. Moreover, as will be discussed in greater detail below, changes may be made based on the customer's usage of the data center architecture.

Figure 2:
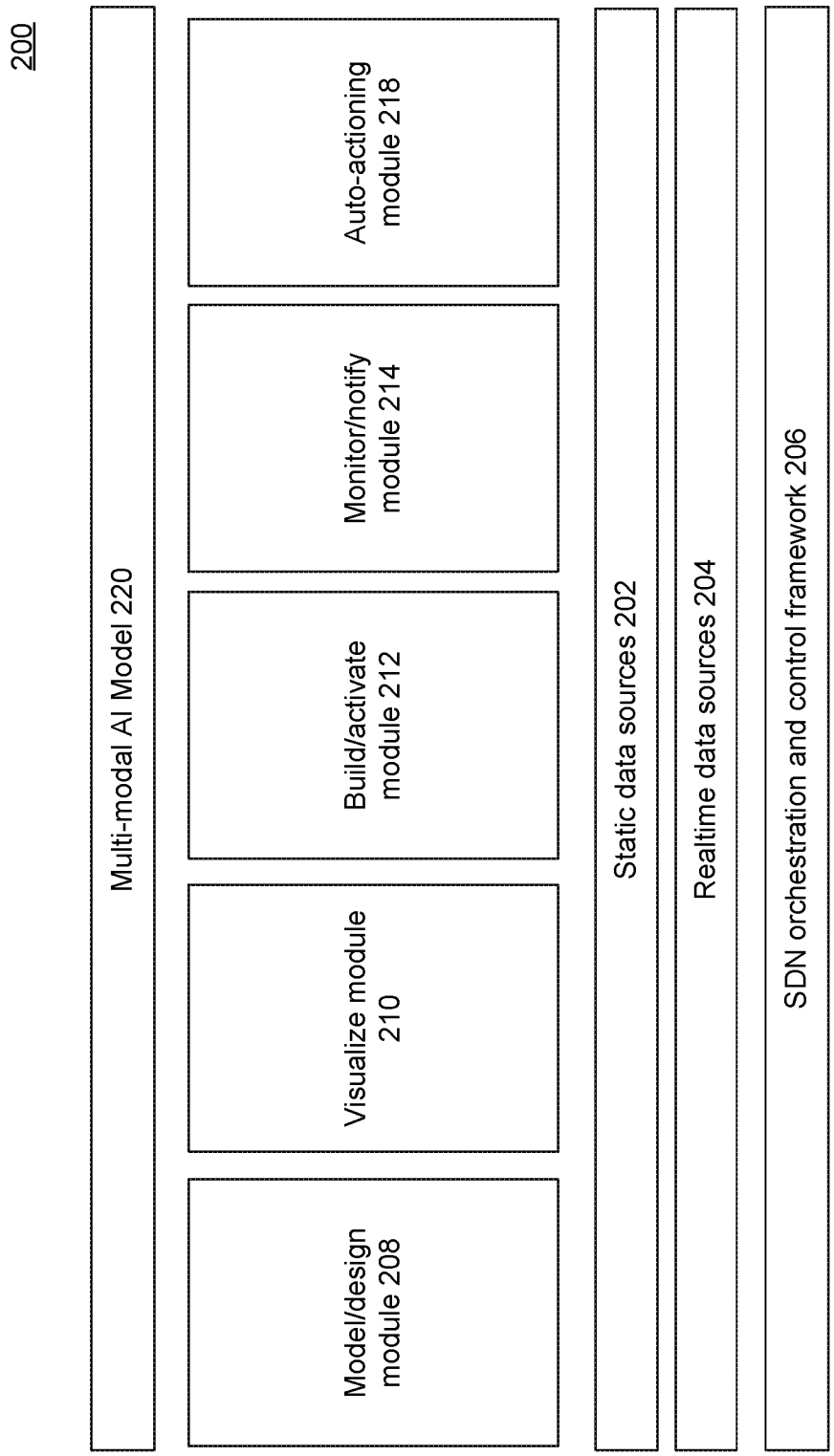
FIG. 2 is a block diagram illustrating various functional components of a system that models provisions in a networked data center architecture, according to an embodiment.

FIG. 2 is a block diagram illustrating various functional components of a system 200 that models and provisions a networked data center architecture, according to an embodiment. System 200 includes various data sources-static data sources 202, realtime data sources 204, and SDN orchestration and control framework 206. Those data sources and automation are used in operation of various modules-a model/design module 208, a visualize module 210, a build/activate module 212, a monitor/notify module 214, and an auto-actioning module 218. To help further engagement with these modules, built on top of them is a multimodal AI model 220. Each of these components is addressed in turn.

Static data sources 202 include data describing the data centers themselves and the surrounding areas that is periodically or intermittently updated. For example, this may include the buildings, the space available in buildings, their locations, and network conductivity entering and exiting the building. It may include location of fiber. It may also include data indicating where the nearest manholes sit on the street to access the fiber. It may also specify different points of entry into the data center, both physical and network point of entries. It may also indicate the relative locations of waterlines and gas lines. A data center's location may indicate which metro area each data center is, and also the data center's address. Static data sources 202 may further specify security features of data centers including its perimeter, such as fencing and dry notes.

Static data sources 202 may include connectivity information surrounding the data center. For example, static data sources 202 may include average latency information on different connections available at the data center. It may also include a listing of layer 2 connections available at the data center. Additionally or alternatively, it may include layer 3 routing information, such as IP autonomous systems and routing tables, relevant to the data center. A data center's connectivity may specify whether there is a cloud on-ramp at a data center, and data about which cloud providers are served, which cloud regions the data center falls into, and data about their computing and other availability. Cloud on-ramps are private, direct connections to the cloud from within the data center.

Static data sources 202 may include power and pricing information at data centers. For example, it may include information about how much power is available. It may also include cost and what pricing structures are available to co-locate equipment in the data centers and for connectivity and other services within the data center.

Static data sources 202 may specify compliance information such as whether the facility is LEEDs (Leadership in Energy and Environmental Design) Gold or Silver compliant or whether the facility complies with data protection regulations such as GDPR (General Data Protection Regulation) in Europe.

Static data sources 202 may pull in information describing the environment. For example, there may be information on seismic activity and weather patterns, such as frequency of tornadoes or hurricanes in the area.

Realtime data sources 204 is data that is updated in realtime or near-realtime. This may involve data center infrastructure management (DCIM) data. This data may include rack power distribution units, universal power supplies, branch circuit meters, remote power panels, floor power distribution units, busways, cameras, door locks, temperature, humidity, water, and other sensors. This data can also include computing and network data, such as processor usage, network traffic counts, and current network latency information.

SDN orchestration and control framework 206 includes scripts that specify on demand, scheduled, and conditional (if/then/else) programmable changes to a data center configuration. For example, the scripts may specify certain conditions under which new connections are provisioned or new space or equipment is ordered.

Model/design module 208 solicits intelligence and information from the customer about what they are trying to accomplish. This may include what their product is or needs, and what they are doing. The information may include a request for proposal. The information solicited may be used to generate possible solutions and to provide recommendations to the user. With the information solicited, model/design module 208 searches available data from data sources 202-204 to determine available networked data center architectures that satisfy the requirements. Finally, model/design module 208 may rank possible solutions according to customer preferences to produce recommended solutions. An example operation of model/design module 208 is provided below with respect to FIGS. 3-9.

Visualize module 210 visualizes network data architectures. In an embodiment, visualize module 210 retrieves, from data sources 202 and/or 204, data center data specifying a plurality of data centers, how the data centers are interconnected, network characteristics of the interconnections, and availability of space at the interconnections. And, it retrieves, from data sources 202 and/or 204, publicly available data describing geographic information relevant to a requirement for the networked data center architecture. Visualize module 210 can overlay the data center data and the publicly available data on a map to assess options for selecting the networked data center architecture. An example operation of visualize module 210 is described below with respect to FIGS. 11-17.

Build/activate module 212 makes calls to build out and provision a networked data center architecture. For example, build/activate module 212 may order bare metal computer resources based on a customer's business needs as an enterprise. A customer may wish to augment their physical deployments with additional, dedicated compute and storage resources, and this is facilitated by any "bare metal" partner that has been integrated onto the ServiceFabric platform. The build/activate module 212 may order virtual resources that it can attach on demand. Virtual resources can include a connection, a cloud connection or resource, a virtual machine, or a container. An example of how a resource can be provisioned is described below with respect to FIG. 10.

Monitor/notify module 214 monitors data sources 202 and 204 and notifies a customer when certain conditions are met. For example, real time data in data source 204 includes power, temperature, and network usage. When certain thresholds are met for power usage, temperature, or network usage, a notification may be sent to the customer.

Auto-actioning module 218 provides for additional automation as described in scripts, for example, in SDN orchestration and control framework 206. Auto-actioning module 218 for example may execute scripts that indicate if a network connection gets to a particular level of usage, or if more bandwidth or another circuit is requested.

Built on top of modules 208, 210, 212, 214, and 218 is multimodal AI model 220. Multimodal AI model 220 may be trained at some point, using previous RFPs configured in model/design module 208 and corresponding solutions that have been selected and built out. Using this data, a conversational AI or a chat box user experience may be configured in layer 220 to enable a user to interact with modules 208, 210, 212, 214, and 218 in a natural way.

FIGS. 3-7 are user interfaces for collecting requirements for a networked data center architecture. The requirements may include a current state of a customer's networked data center architecture and requirements for a future state of a customer's networked data center architecture. The current state is useful to understand and calculate costs of implementing a new future state.

Figure 3:

FIG. 3 is a user interface for gathering requirements on compliance needs of a data center architecture. Compliance needs may include compliance with at least one of a data privacy standard, an environmental, social, and corporate governance (ESG) standard, or a cybersecurity standard. Examples of data privacy standards include Health Insurance Portability and Accountability Act (HIPPA) and General Data Protection Regulation (GDPR). Examples of ESG standards include LEEDS Silver and Gold. Examples of data security standards include Federal Information Security Modernization Act (FISMA) and ISO 2701.

FIG. 4 is a user interface to gather information for applications required of the data center architecture, including what they are, where they are hosted (e.g., in the cloud, at a collocated data center, or on a customer's premises), and what the performance tolerances for the applications are (e.g., latency). For example, applications that perform batch processing or background tasks may have higher latency tolerance than an application that responds to user requests or events.

The applications can be, for example, web applications, Software as a Service (Saas), Platform as a Service (PaaS), and Infrastructure as a Service (IaaS). Web applications run on web browsers and interact with servers over the internet. Software as a Service (SaaS), are applications that are delivered as a subscription-based service over the internet, without requiring installation or maintenance on the user's end. They can be hosted in data centers or in cloud-based service providers, depending on the service level agreements, performance, and reliability of the service. Examples of SaaS applications may provide email, document editing, analytics or machine learning. Platform as a Service (PaaS) are platforms that provide the infrastructure, tools, and frameworks for developing and deploying applications over the internet, without requiring the management of the underlying servers, networks, or operating systems. They are usually hosted in cloud-based service providers, such as Amazon Web Services, Microsoft Azure, or Google Cloud Platform. Infrastructure as a Service (IaaS). These are services that provide the basic computing, storage, and networking resources for running applications over the internet, without requiring the ownership or control of the physical hardware. They are also usually hosted in cloud-based service providers, such as the ones mentioned above.

FIG. 5 is a user interface to gather information on customer locations for a data center architecture. This may include the locations of the customer's premises and locations for data center sought in the networked data center architecture. It may specify specific locations (such as a particular building at an address). Alternatively or additionally, the location may be an area, such as a region or metropolitan area.

As mentioned above, the requirements include cloud connections sought in the networked data center architecture. For example, it may include a specification of whether a cloud on-ramp is required at a location.

Figure 6:
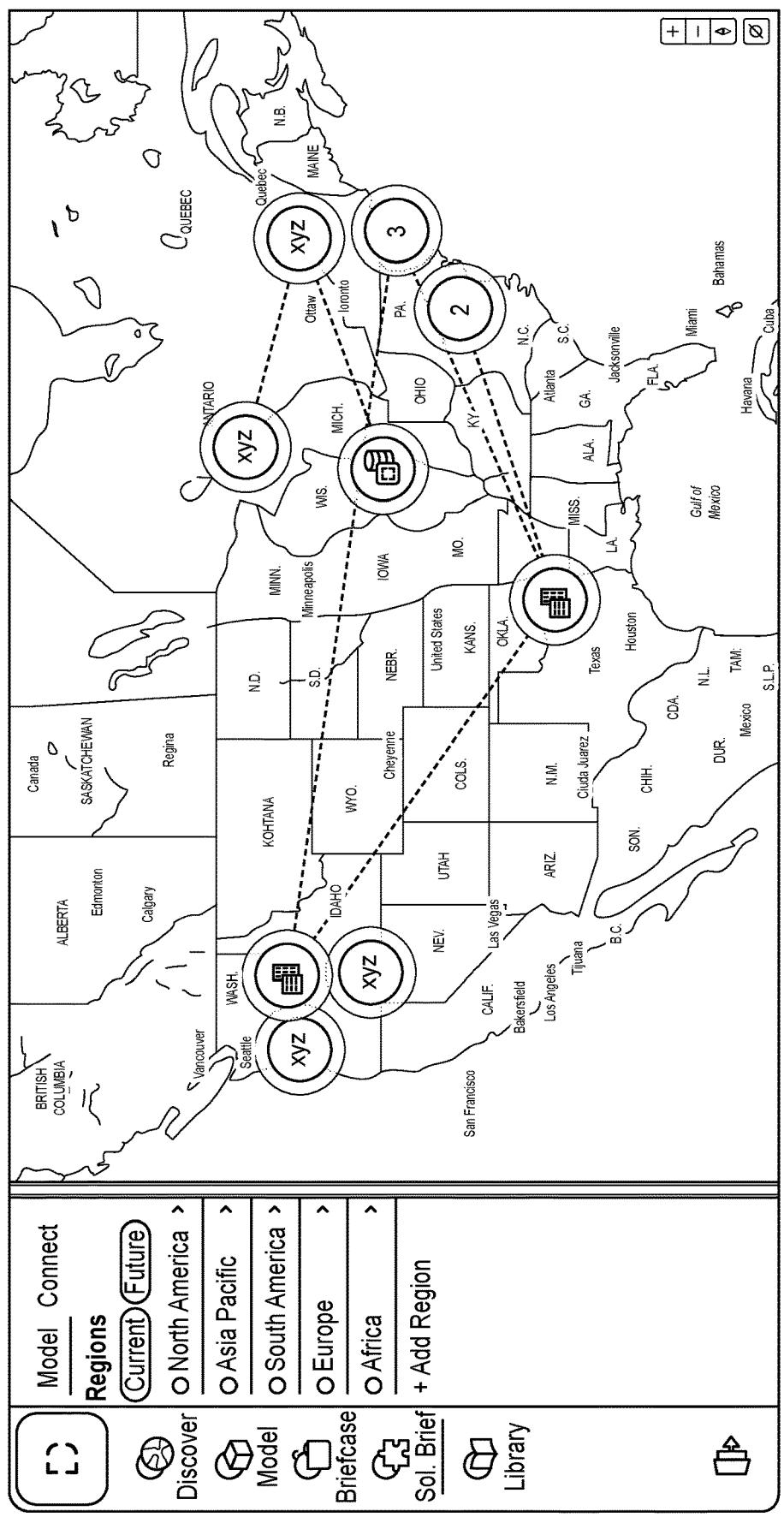

FIG. 6 is a user interface illustrating the requirements for space and applications of a data center architecture geographically. In an example, a customer can add a data center, edit it, name it, and place where it is. For each data center, space requirements can be imposed, such as cabinets, cages, and power required. Also, requirements on what needs to be executed at the data center (e.g., high performance computing instances to use express route with a firewall).

Figure 7:
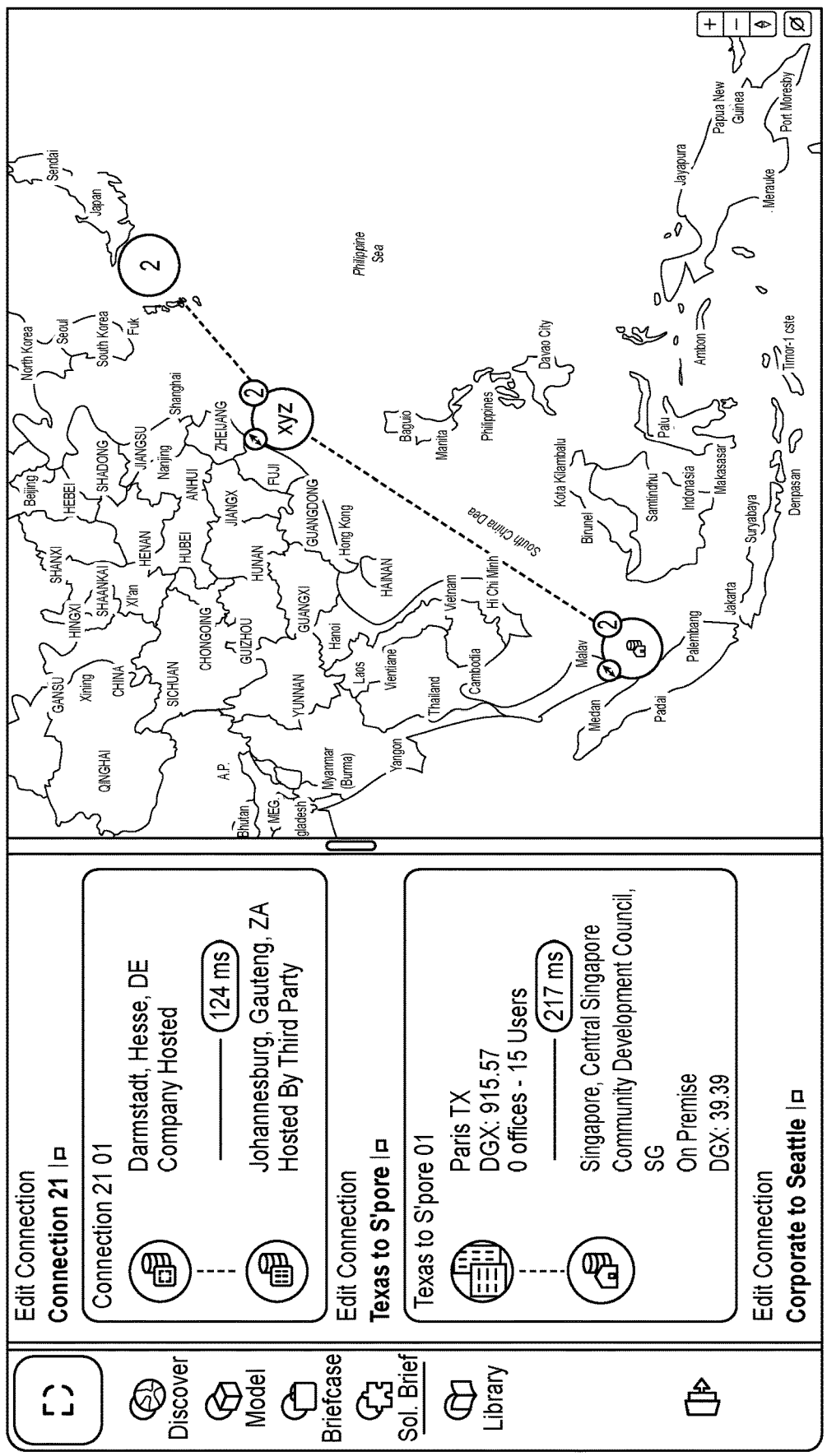

FIG. 7 is an interface illustrating requirements for connectivity of a data center architecture. Using this interface, the connections needed between data center and their requirements are defined. The connections can be specified by OSI layer (e.g., layer 2, layer 3), by technology (e.g., Ethernet, IP), and by latency, throughout, and jitter requirements.

For each of the locations and connections, preferred or designated partners and suppliers, such as network service providers and equipment suppliers, may be specified. An example of a network service provider is Verizon. A data center customer may have a long relationship with a network service provider or may use them for a lot of incumbent services, so they may prefer to work with vendors that service a particular data center.

FIGS. 8-9 are user interfaces for presenting options such as space and equipment for a networked data center architecture generated according to the collected requirements.

FIG. 8 illustrates an example interface listing data centers with space meeting requirements for a data center architecture. As mentioned above, these data centers may be sorted based on preferences. For example, the requirements may indicate that a data center is required in the Chicago metropolitan area with availability to host a lot of storage and to do a lot of really high-performance compute, and the data center must be LEEDs Gold certified. There may be several buildings that qualify. One may be located in downtown Chicago and may have extremely network low latency values, but the price is more expensive. Another may be located in a suburb of Chicago and may have greater network latency values, but at a less expensive cost. The possible solutions are presented and sorted for the user as recommendations and the customer can select a desired recommendation.

In addition to options for data center space and connectivity, the solution may also include equipment needed to build out a space within the data center. FIG. 9 illustrates a catalog of available equipment components that can be used to create the data center architecture. For example, the solution may recommend 72-inch cabinets, with a door on the front and a mesh rear with a fan for extra airflow. A catalog with the recommended parts may be presented to the customer.

As described above, on selection from the customer, the desired solution may be built out. Building out the solution may include allocating the space needed at a data center, ordering the parts and provisioning any needed network connections.

Figure 10:
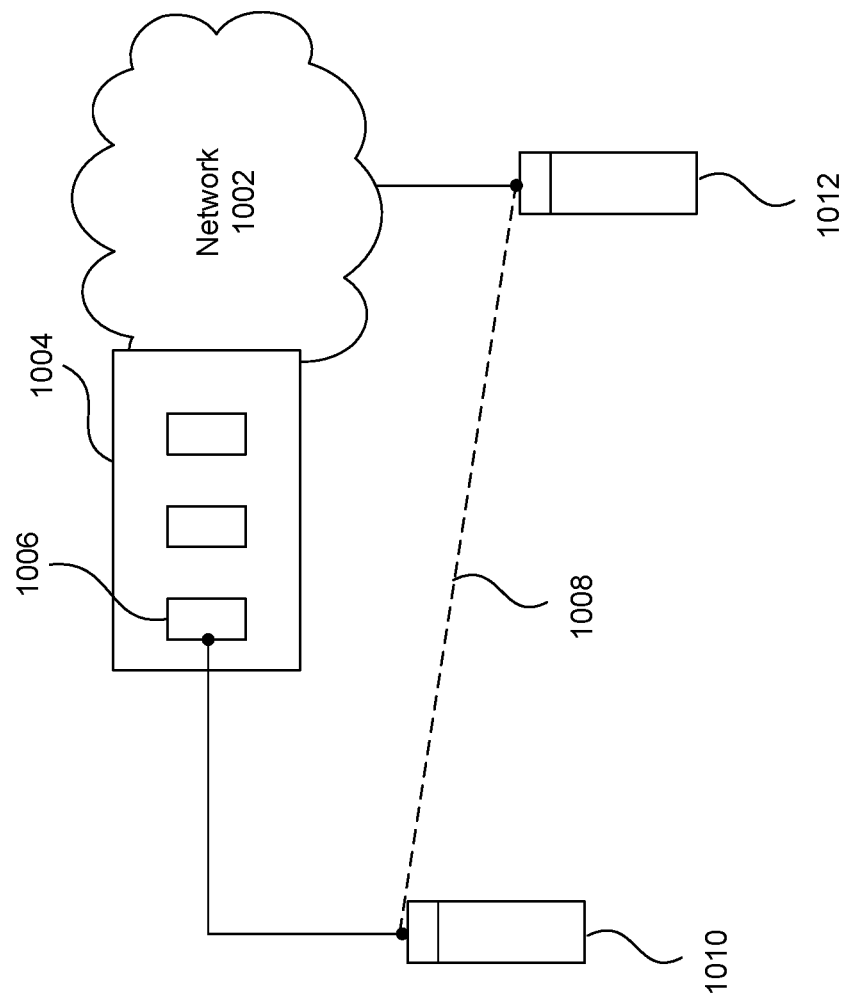
FIG. 10 is a system diagram illustrating establishing connectivity for a networked data center architecture generated according to the collected requirements.

FIG. 10 is a system 1000 illustrating establishing connectivity for a networked data center architecture generated according to the collected requirements. As mentioned above, the customer may specify anchor points for the connection. As shown in FIG. 10, point 1010 may be customer equipment in a data center cabinet and point 1012 cloud on-ramp. A connection 1008 needs to be established between points 1010 and 1012. Connection 1008 may be over the Internet, or it may be over a private, dedicated connection. In different examples, connection 1008 may be building to building, data center to data center, data center to cloud, data center to on-demand resource, or cloud to cloud.

According to an embodiment, complexity needed to set up the connection between points 1010 and 1012 is hidden from the customer. For example, system 1000 includes a switch 1004 and a network 1002. In response to selection of a solution including connection 1008, a message is sent to 1004 to activate port 1006, allowing data to flow between points 1010 and 1012. In this way, a connection 1008 is provisioned. In this example, switch 1004 and port 1006 may be data link layer 2 devices, such as Ethernet devices. This may allow provision of connection 1008 as an Ethernet connection between points 1010 and 1012. Additionally or alternatively, connection 1008 may include a layer 3 link, such as an IP link. In this example, routing tables may need to be updated, for example, using Border Gateway Protocol (BGP) to enable exchange of routing information between autonomous systems (AS) on the Internet.

Figure 11:
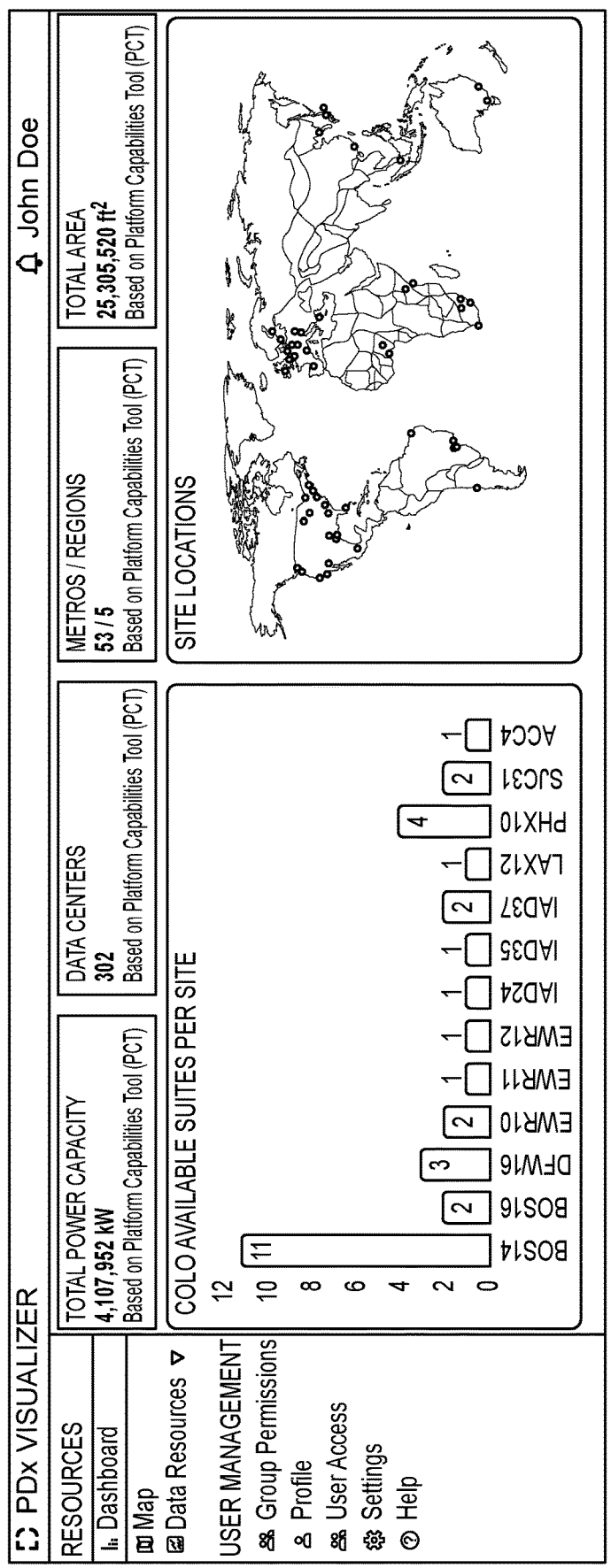
FIGS. 11-17 are user interfaces for visualizing possible networked data center architectures.

FIGS. 11-17 are user interfaces for visualizing possible networked data center architectures. FIG. 11 shows available colocation suites at different data center sites.

Figure 12:
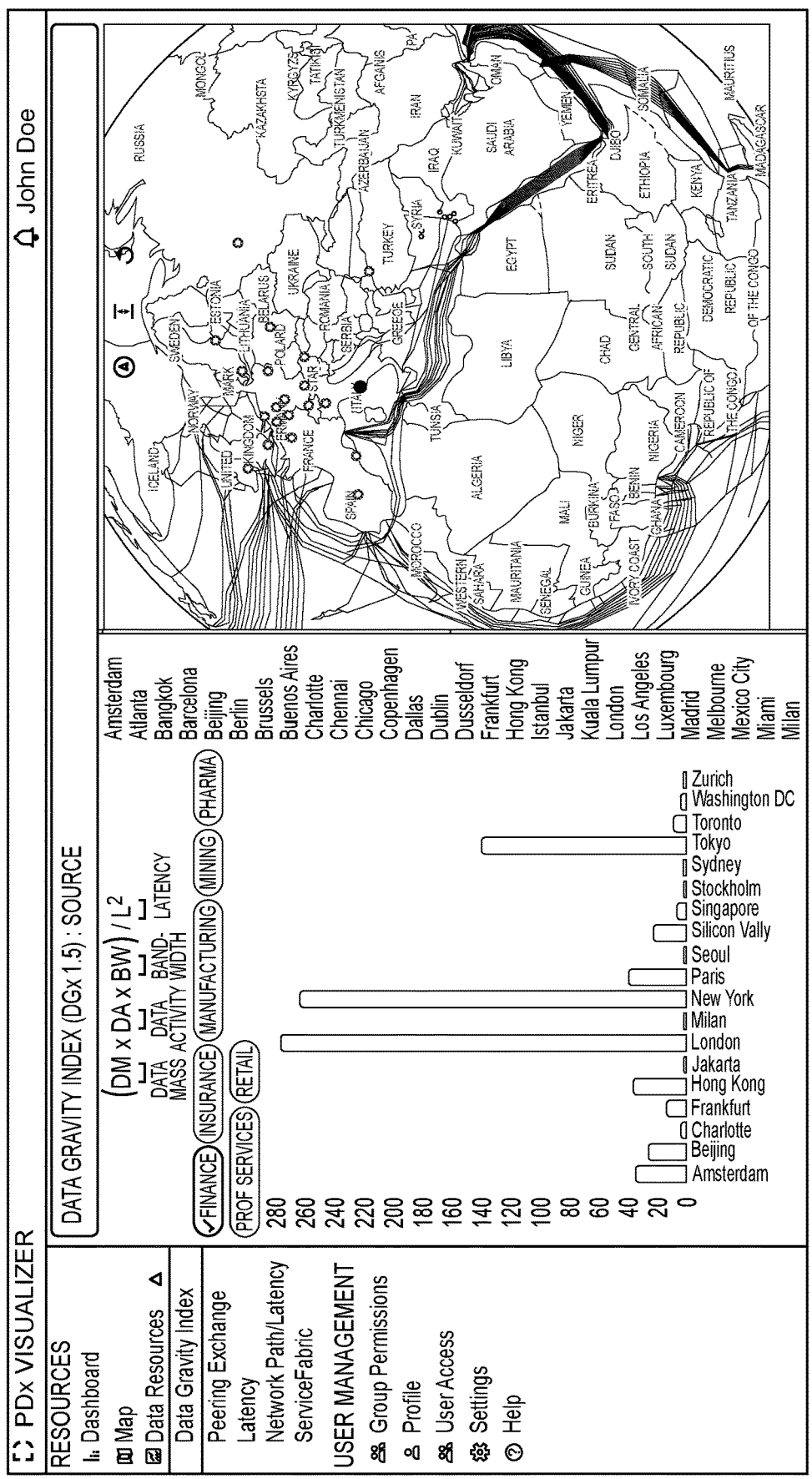

FIG. 12 is a user interface illustrating data gravity at different metropolitan areas globally. Data gravity refers to the tendency of data to attract more data, applications, services, and users to itself, creating a positive feedback loop that increases the value and utility of the data. Data gravity is at least in part driven by the challenges and costs of moving or accessing large amounts of data across different locations, platforms, or networks, especially as data volumes and complexity grow. Data gravity can be useful for a customer in planning infrastructure growth. Locations with high data gravity may vary based on industry.

For example, if a financial services company clusters most of its financial data in London and New York, but its consumers are in Phoenix, the data gravity index may show that. It may prompt the financial services company to move its information closer to the people who are consuming it, particularly if power and space are less expensive in that area.

Figure 13:
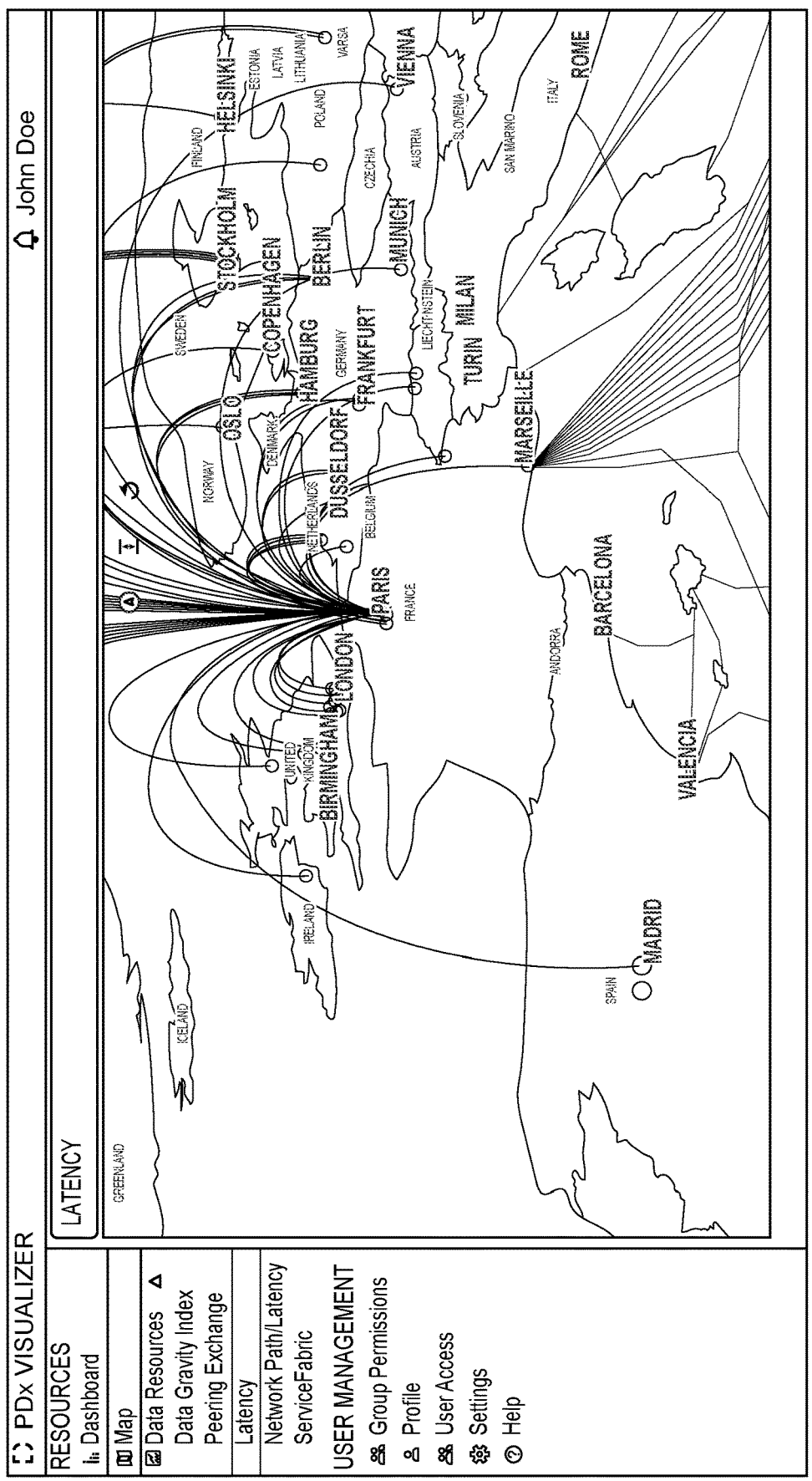

FIG. 13 is a user interface illustrating connection latency between metropolitan areas. In response to a user selecting a building, the interface may display the latency to every other building for which direct connectivity is available. In addition to latency, jitter and loss values may also be presented.

Figure 14:
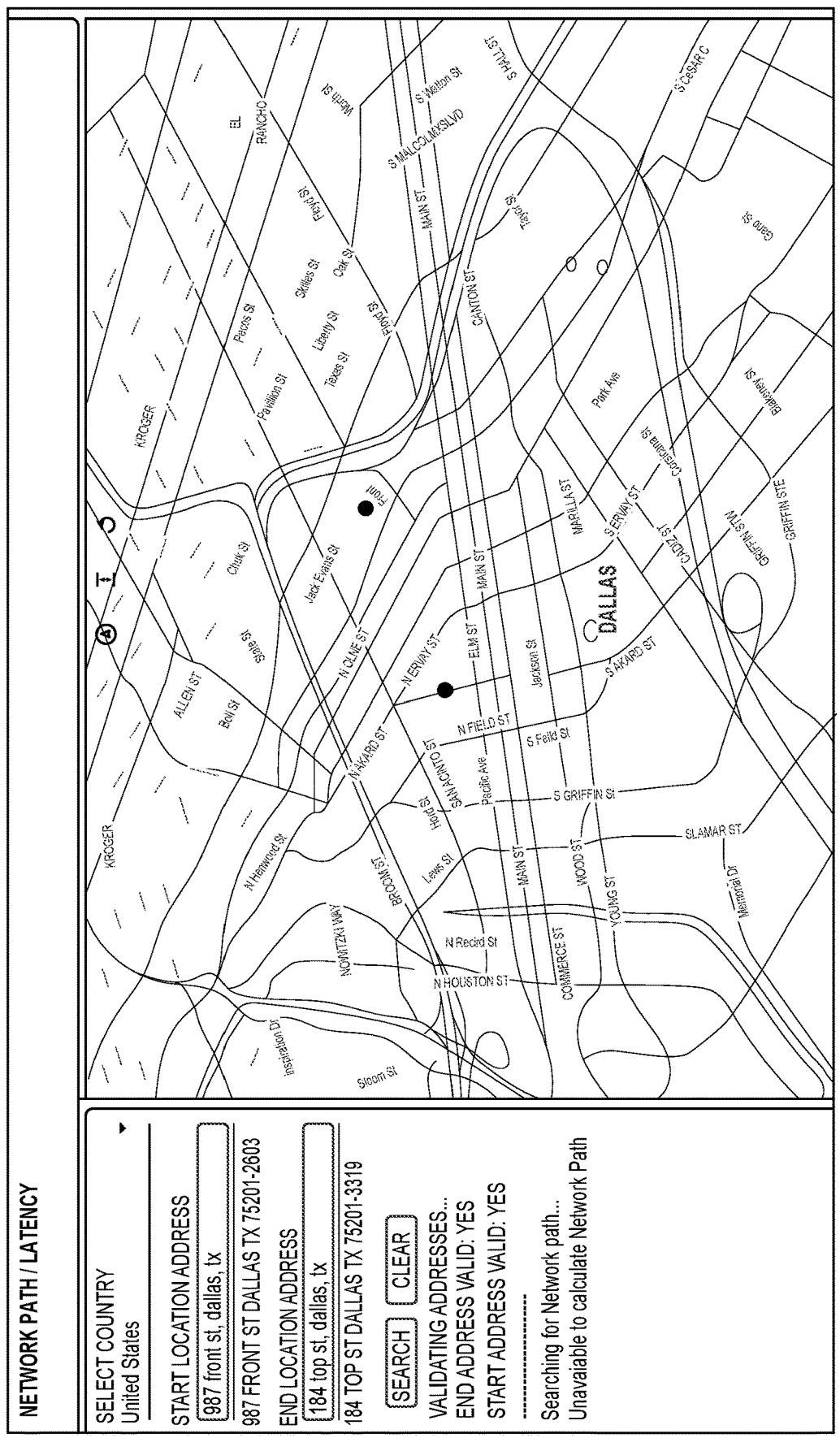

FIG. 14 is a user interface illustrating connection latency between addresses. In this interface, a customer enters two addresses. If there are any known available paths between two locations, the interface will come back with a specific path available along with latency, and possibly jitter and loss data as well.

Figure 15:
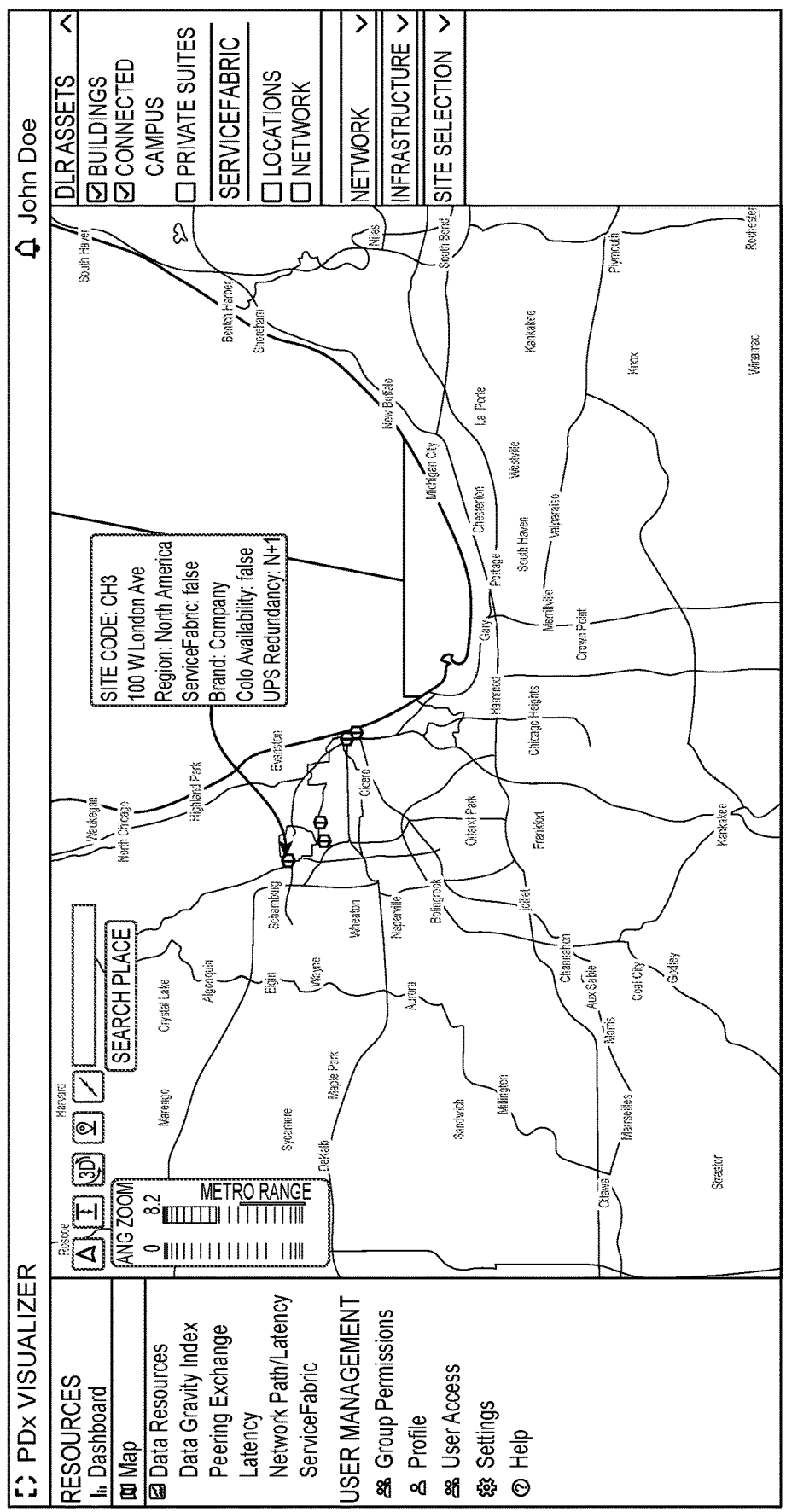

FIG. 15 is a user interface illustrating data centers overlaid on a map. When a customer selects the data center, information describing the data center is presented on a card overlaying the map.

Figure 16:
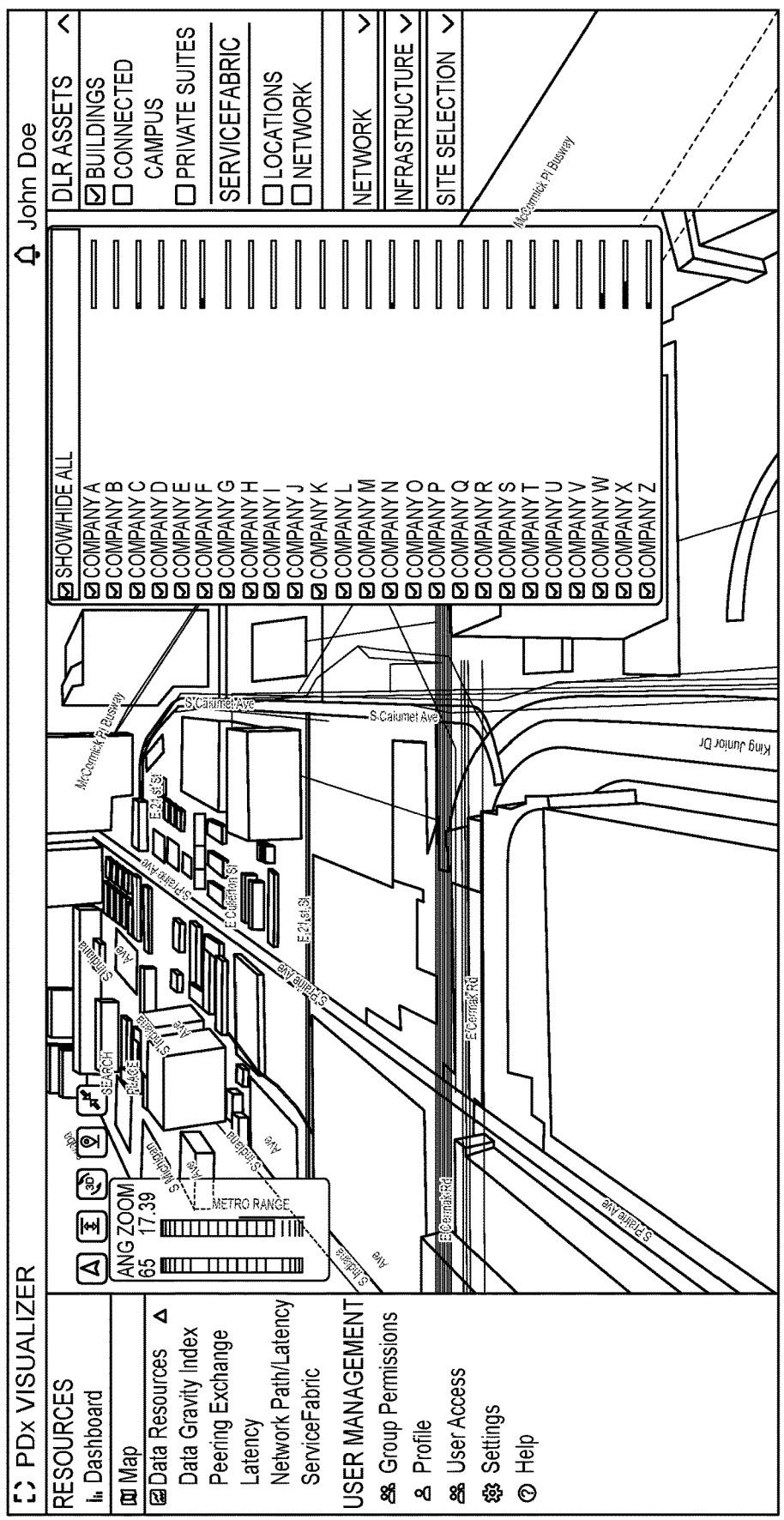

FIG. 16 is a user interface visualizing connectivity between data centers. This connectivity could represent physical fiber connecting the locations. It could represent peering between autonomous systems. Additionally or alternatively, submarine cables and landing stations available may be presented.

Figure 17:
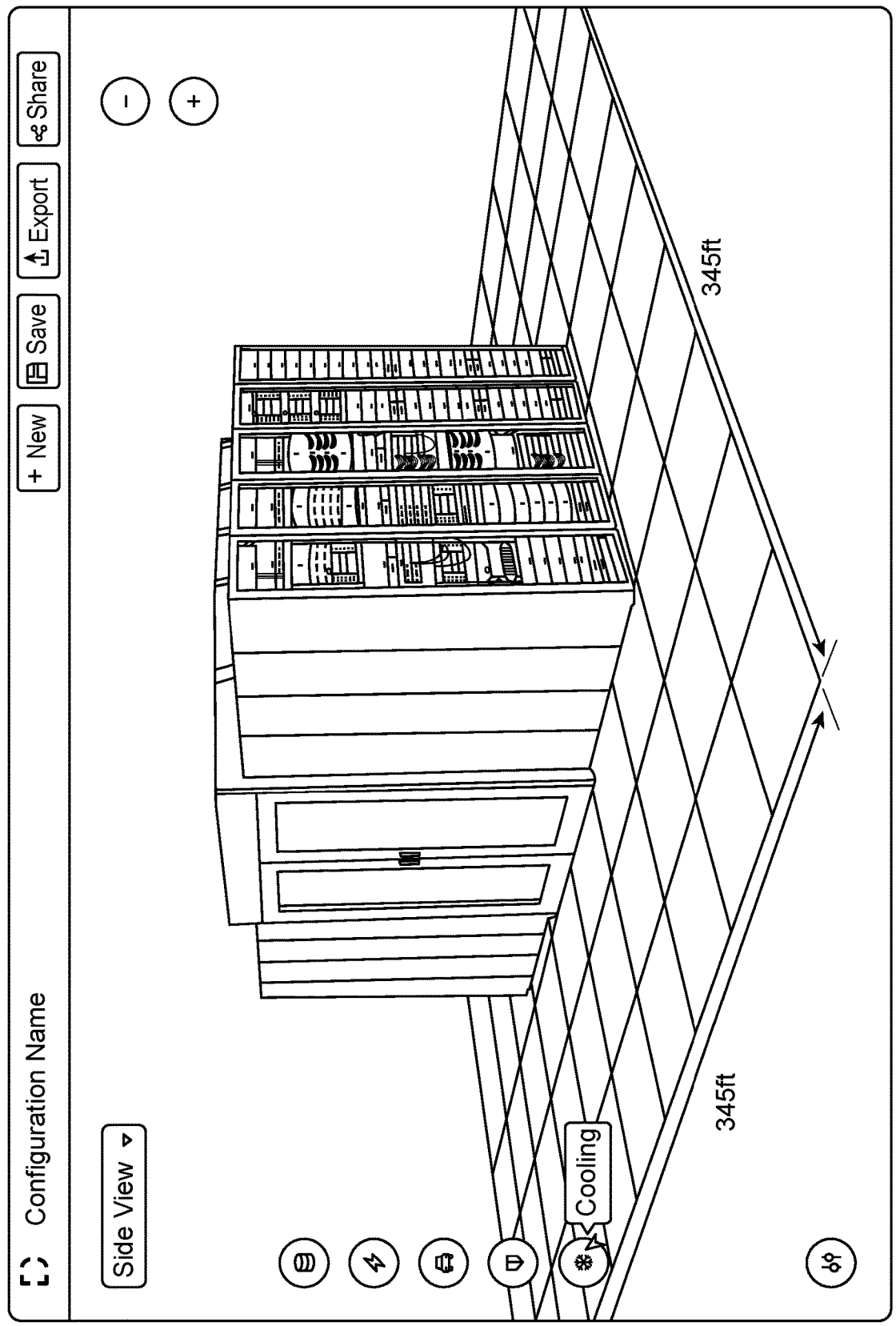

FIG. 17 is a user interface visualizing a built out suite in a data center. As described above, relevant data for the metro, the region, and the world may be visualized. The data center itself may be rendered as a three-dimensional space and presented to a user. In an embodiment, a customer can zoom into a data center building and actually create and expand that visualization. With this, the customer can tour a data center without the need to be physically present. It can provide a customer with an understanding of the space, the floorplan, and it can present a digital twin of the customer's equipment. The digital twin may include a complete inventory of the data center architecture (including the customer's equipment, connections, and partner relationships). The inventory may further include portions of the data center provider's physical, cooling power, and other environmental infrastructure that are relevant to the customer's data center architecture. The inventory may be updated as the customer's data center architecture changes in real time.

Each of the modules and functions described about may be implemented on one or more computing devices with a processor and memory. Instructions specifying the modules and functions may be specified in instructions in memory that is read and executed by the processor. One or more of the processors may include a central processing unit (CPU) or a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. Similarly, one or more of the processors may be a deep learning processor (DLP). A DLP is an electronic circuit designed for deep learning algorithms, usually with separate data memory and dedicated instruction set architecture. Like a GPU, a DLP may leverage high data-level parallelism, a relatively larger on-chip buffer/memory to leverage the data reuse patterns, and limited data-width operators for error-resilience of deep learning.

The computing device may also include a main or primary memory, such as random access memory (RAM). The main memory may include one or more levels of cache. Main memory may have stored therein control logic (i.e., computer software) and/or data.

The computing device may also include one or more secondary storage devices or memory. The secondary memory may include, for example, a hard disk drive, flash storage and/or a removable storage device or drive.

The computing device may further include a communication or network interface. The communication interface may allow the computing device to communicate and interact with any combination of external devices, external networks, external entities, etc. For example, the communication interface may allow the computer system to access external devices via a network, which may be wired and/or wireless (or a combination thereof), and which may include any combination of LANs, WANs, the Internet, etc.

The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention(s) are defined solely by the appended claims including any amendments made during the pendency of this application and all equivalents of those claims as issued.

Identifiers, such as "(a)," "(b)," "(i)," "(ii)," etc., are sometimes used for different elements or steps. These identifiers are used for clarity and do not necessarily designate an order for the elements or steps.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, or contains a list of elements, does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

What is claimed is:

1. A method for automatically determining a networked data center architecture, comprising:
   assembling a database describing capabilities of a data center provider, the database describing capabilities of a plurality of data centers of the data center provider, the capabilities comprising availability of physical computer server space and network connectivity service for customers of the data center provider;
   receiving a specification of requirements for the networked data center architecture, the specification describing a customer's desired physical computing server space and the customer's desired networked connectivity;
   searching the database to determine a solution including a plurality of connections and a data center that satisfies the specification; and
   based on the searching, outputting the solution as a recommendation to provide the networked data center architecture.

2. The method of claim 1, wherein the requirements include a compliance with at least one of a data privacy standard, an ESG standard, or a cybersecurity standard.

3. The method of claim 1, wherein the requirements include locations for each data center sought in the networked data center architecture.

4. The method of claim 1, wherein the requirements include cloud connections sought in the networked data center architecture.

5. The method of claim 1, wherein the requirements include a specification of at least one application supported by the networked data center architecture.

6. The method of claim 5, wherein the requirements include a specification of where a server providing the at least one application is hosted.

7. The method of claim 1, wherein the requirements include a specification of vendors utilized to build or support the networked data center architecture.

8. The method of claim 1, wherein the searching the database comprises determining a plurality of solutions, each of the plurality of solutions including the plurality of connections and the data center that satisfy the specification.

9. The method of claim 8, further comprising:
   for each of the plurality of solutions, determining a score for a respective solution based on a preference of the customer.

10. The method of claim 9, further comprising:
    sorting the plurality of solutions based on the determined score.

11. The method of claim 10, further comprising:
    receiving a selection of the recommendation; and
    in response to the selection, calling at least one API to provision the plurality of connections through an SDN orchestration and control framework.

12. The method of claim 1, further comprising:
    retrieving data center data comprising data specifying the plurality of data centers, how the data centers are interconnected, network characteristics of the interconnections, and availability of space at the interconnections;
    retrieving publicly available data describing geographic information relevant to a requirement for the networked data center architecture; and
    overlaying the data center data and the publicly available data on a map to visualize options for selecting the networked data center architecture.

13. The method of claim 12, wherein the data specifying the plurality of data centers includes locations of each data center of the plurality of data centers.

14. The method of claim 13, wherein the data specifying the plurality of data centers specifies layer 2 connections between the plurality of data centers.

15. The method of claim 13, wherein the data specifying the plurality of data centers specifies layer 3 routing between the data centers.

16. The method of claim 13, wherein the data specifying the plurality of data centers specifies latency between the data centers.

17. The method of claim 13, wherein the publicly available data specifies public infrastructure.

18. The method of claim 13, further comprising: on the map, zooming into a representation of a data center from the plurality of data centers.

19. The method of claim 18, wherein the representation of the data center is a three dimensional model of the data center.

* * * * *